G. BABCOCK.
TELEPHONE EXCHANGE SYSTEM.
APPLICATION FILED JAN. 22, 1910.
1,138,174. Patented May 4, 1915.
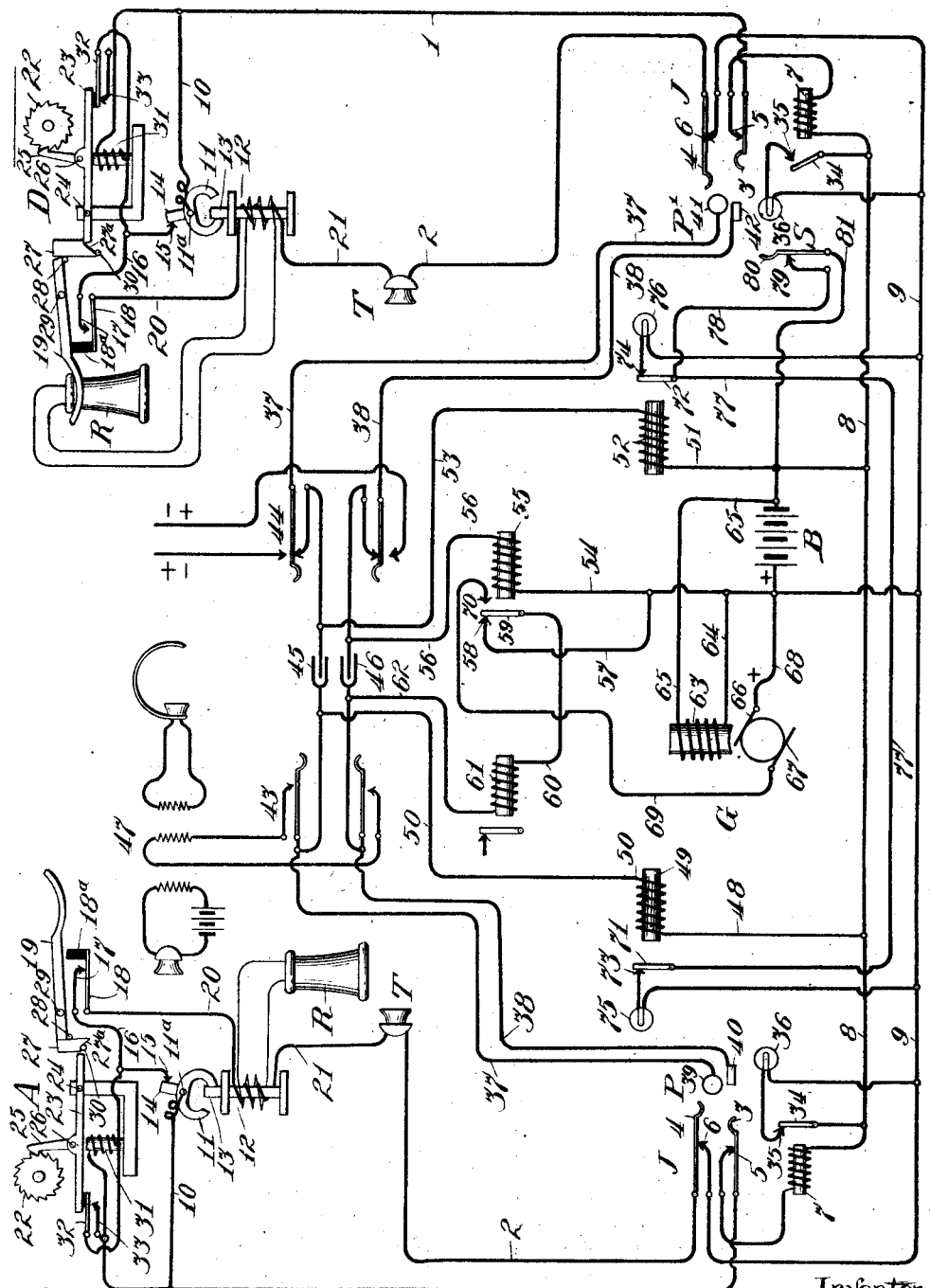

UNITED STATES PATENT OFFICE.

GARRISON BABCOCK, OF ROCHESTER, NEW YORK, ASSIGNOR TO TELECHRONOMETER COMPANY, OF ROCHESTER, NEW YORK, A CORPORATION OF NEW YORK.

TELEPHONE-EXCHANGE SYSTEM.

1,138,174. Specification of Letters Patent. Patented May 4, 1915.

Application filed January 22, 1910. Serial No. 539,466.

*To all whom it may concern:*

Be it known that I, GARRISON BABCOCK, a citizen of the United States, residing at Rochester, in the county of Monroe and State of New York, have invented a certain new and useful Improvement in Telephone-Exchange Systems, of which the following is a full, clear, concise, and exact description, reference being had to the accompanying drawings, forming a part thereof.

My invention relates to service meters for telephone exchange systems, and has reference particularly to that class of service meters in which the metering mechanism is located at the substations.

It is an object of my invention to provide a service metering system of such a kind that the operating magnet of the meter is normally short-circuited by means of a shunt closed around its terminals either by the operated position of the meter or the normal position of the controlling mechanism connected with the line circuit, which controlling mechanism is effective in causing the operation of the meter.

The controlling mechanism as shown in the present embodiment consists essentially of a polarized relay adapted to be operated by a current flowing in one direction in the line circuit, but unresponsive to current flowing in the opposite direction. The meter operating mechanism is so constructed that it is not normally in an operative position, and must first be set before it can be operated to register a call.

The setting of the meter operating mechanism is accomplished mechanically by the switch hook of the substation as it moves from its normal to its calling position. In the latter position mechanical connection between the switch hook and the meter operating mechanism is interrupted in order that the meter may be freely operated by the action of the controlling mechanism in response to a current reversal in the line. This current reversal is produced by the operation of a relay at the exchange associated with the cord circuit used to establish connection between the calling and the called lines. The operation of this relay serves to interrupt a normal battery connection and connect to the cord circuit a second source of energy of higher potential than the battery normally employed, which second source is connected to the battery in such a direction that when it supplies current to the line such current flows in a direction through the battery in opposition to the direction of normal current flow through such battery, and therefore is effective in charging the battery; and it will be understood that the difference of pressure between the two sources of electricity is impressed upon the line.

In the accompanying drawings illustrating my invention, the substation A is connected by line wires 1 and 2 with the exchange, the line circuit there terminating in the tip and sleeve springs 3 and 4 respectively of the line jack J. The springs 3 and 4 normally make contact with the contact springs 5 and 6 respectively. The spring 5 is connected with the winding of the line relay 7, the other terminal of which is connected by wire 8 with the negative pole of the battery B. The spring 6 is connected by wire 9 with the positive pole of battery B.

At the substation the line wire 1 is connected by a wire 10 with the pivotal point of a polarized armature 11 of the combined induction coil and magnet 12, the core 13 of which is extended to attract the polarized ends of the armature 11. The armature 11 carries a contact 14 adapted to engage a contact 15 when the armature is in its normal position. The contact 15 is connected by a wire 16 with a contact 17 adapted to engage a spring 18 when the switch hook 19 is in its raised or calling position. The spring 18 is connected by a wire 20 with the primary winding of the induction coil 12, the other terminal of which is connected by wire 21 with the transmitter T, the other terminal of which is connected directly to the line wire 2. The secondary winding of the induction coil 12 is connected directly with the receiver R, as indicated.

The register mechanism 22 is adapted to be operated by a lever 23 pivoted at 24 by means of a pawl 25 pivoted at 26 to such lever. The right-hand end of the lever is extended beyond the pivot 24 to be engaged by a pawl 27 pivotally connected to the left-hand end of the switch hook 19, by an offset hinge, as indicated at 28, said switch hook being pivotally supported at 29. The pawl 27 is so conformed that when the switch hook is in its lower or normal position the shoulder formed on the lower end of such pawl rests over the right-hand end of the lever 23, and as the switch hook 19 is raised while being moved to its normal position the spring usually provided to cause this operation, and not shown, depresses the right-hand end of the lever 23, thus raising the pawl 25 to bring it into engagement with one of the teeth of the register mechanism 22 in advance of the one previously engaged by such pawl.

The continued motion of the switch hook 19 in an upward direction causes engagement between a cam surface 27$^a$ at its lower end and a fixed stop 30, as a result of which the pawl 27 is moved upon its pivot 28 to cause it to be disengaged from the lever 23, which would thereupon fall to its normal position were it not for the new engagement between the pawl 25 and the register mechanism 22 above referred to. The lever 23 also serves as a polarized armature for the operating magnet 31 of the registering mechanism, as a result of which when the magnet 31 is properly energized the lever 23 is moved forcibly downward, thus rotating the registering mechanism to advance it one indication. This motion of the lever 23 depresses the spring 32 against the contact spring 33. The operating magnet 31 is connected between the line wire 1 and the wire 16, as indicated, and the contact springs 32 and 33 are connected to the terminals of the operating magnet, as result of which when the lever 23 has been moved downward to its operated position the closure of the contacts 32 and 33 establishes a short circuit between the terminals of the operating magnet, and further operation of such magnet is therefore prevented until the lever 23 is again moved upward mechanically by means of the switch hook 19. A further result accomplished by the closure of the contacts 32 and 33 is that the impedance of the operating magnet 31 is removed from the line circuit during talking.

The switch hook 19 is so disposed relatively to the contacts 17 and 18 that when in its depressed position, which is its normal position under the weight of the receiver R, it engages a block of insulation 18$^a$ carried by the spring 18, and thus separates the contacts 17 and 18 and interrupts the circuit through the primary winding of the induction coil 12, which primary winding is also effective in energizing the core 13 to cause operation of the armature 11. The primary winding referred to is so wound that current in one direction, which, in the embodiment herein shown, is assumed to be in a direction entering the winding from the wire 21, will attract the armature 11 in a manner to close and maintain such armature in its normal position to close the contacts 14 and 15, which closure establishes a shunt or short circuit through the wires 10 and 16 between the terminals of the operating magnet 31.

Assuming that the receiver R has been removed from the switch hook 19, as shown at the substation A, the contacts 17 and 18 are closed, and thus in a manner well known in the art, the line relay 7 is energized by the pulling up of its armature 34 against the contact 35, and a circuit is closed between the wires 8 and 9 through the line lamp 36 to signal the operator at the exchange that a connection is desired. The current in the line at this time flows through the transmitter T, the primary winding of the induction coil 12 and through wires 16 and 10, and by the motion of the switch hook 19 to its raised position the lever 23 and pawl 25 have been set in a position to operate the register mechanism 22. This condition continues until the direction of current flow through the instrumentalities referred to is reversed, at which time the opposite pole of the armature 11 is attracted, thus separating the contacts 14 and 15, as a result of which the line current now flows through the operating magnet 31 as well as through the other instrumentalities described. This results in the attraction of the lever 23 and the advance of the registering mechanism 22. When the lever 23 reaches its lower position it closes the contacts 32 and 33, thus short-circuiting the operating magnet 31, and the lever remains in this position, as a result of its weight until again returned to its set position by the motion of the switch hook 19. The reversal of current flow in the line circuit is accomplished as follows:

The cord circuit herein shown consists of two strands 37, 38, extending from the tip and sleeve 39, 40 of the answering plug P to the tip and sleeve 41 and 42 of the calling plug P', respectively. The strands 37 and 38 have connected in them the listening key 43 and the ringing key 44, and these strands are interrupted conductively, although continuous inductively by the condensers 45, 46, in a manner well known in the art. An operator's set 47 is provided in the usual manner, such set being connected with the listening key 43.

The battery B has its negative terminal connected by the wires 8 and 48 with one terminal of the winding of the tip supervisory relay 49, the other terminal of which is connected by wire 50 with the answering end of the strand 37. The same terminal of the battery B is also connected by wire 51 with one terminal of the winding of the tip supervisory relay 52, the other terminal of which is connected with the calling end of the strand 37 by wire 53. The positive pole of the battery B is connected by wire 54 with one terminal of the winding of the sleeve supervisory relay 55, the other terminal of which is connected by wire 56 with the calling end of the strand 38. The same pole of the battery B is also connected by wires 54 and 57 with the back contact 58 of the armature 59 of the relay 55. The armature 59 is connected by wire 60 with one terminal of the winding of the sleeve supervisory relay 61, the other terminal of which is connected by the wire 62 with the answering end of the sleeve strand 38. A generator G is provided, and has its field winding 63 connected by wires 64 and 65 directly with the terminals of the battery B. The positive and negative brushes 66 and 67 of the generator are connected respectively by wires 68 and 69 with the positive pole of the battery B and the front contact 70 of the armature 59.

The armatures 71 and 72 of the supervisory relays 49 and 52 are normally in engagement with their back contacts 73 and 74, which are connected with the supervisory lamps 75 and 76, respectively, the other terminals of these lamps being connected together by the wire 9 to the positive pole of the battery B. The armatures 71 and 72 are connected together by the wire 77, and are also connected by the wire 78 with the spring contact 79 of the plug seat switch S, the other member 80 of which is connected by wire 81 with the negative pole of the battery B.

As a result of the circuit connections above described, when the operator answers a call received by the flashing of the lamp 36 and inserts the answering plug P into the jack J, the line relay 7 is deënergized by the separation of the jack springs 3 and 4 from the contacts 5 and 6, respectively, and current is now supplied from the battery B through the supervisory windings 61 and 49 to the line wires 1 and 2 in the same direction as it was previously supplied through the springs 5 and 6, as a result of which no actuation of the armature 11 occurs, since the core 13 is magnetized in the same direction.

This condition continues until the called subscriber, after having been properly connected by the insertion of the calling plug P' in the jack J', and operation of the signaling mechanism, not shown, at the called substation, responds by removing his receiver from his switch hook. The signaling mechanism at the substation is not shown here in detail since it forms no part of this invention. When the called subscriber removes his receiver from the switch hook he closes a circuit through the substation apparatus, thus causing the energization of the relay 55. This results in pulling up the armature 59 and interrupting the circuit from the positive pole of the battery B through wires 57 and 60 to the winding of the supervisory relay 61, and closing a path between the negative brush of the generator G through wire 69, contact 70, armature 59, and wire 60 to the same terminal of the relay 61.

The potential developed by the generator G should be approximately twice the potential of the battery B, and as a result current is caused to flow through the battery B in opposition to its voltage, and the resultant voltage impressed upon the strands 37 and 38 is of about the same value as the voltage of the battery B but in a reverse direction. The generator G is especially constructed so as to supply direct noiseless current to the substation circuit which is adapted for talking purposes, and by its flow through the primary winding of the induction coil 12 it reverses the polarity of the core 13, thus rotating the armature 11 around to the left upon its pivot 11ᵃ and separating the contacts 14 and 15, and, since the contacts 32 and 33 are open and the contacts 17 and 18 are closed, the operating magnet 31 is energized, thus advancing the register 22, at the close of which operation the contacts 32 and 33 are closed to prevent further accidental registration. Another registration can only be made after the switch hook 19 has been moved to its normal position and again released.

From the circuits above described it will be noticed that the supervisory lamps 75 and 76 are lighted when the apparatus at the corresponding substations is returned to its normal position by hanging the receivers upon the hooks and that flow of current through the supervisory lamps 75 and 76 is interrupted by the opening of the plug seat S when the calling plug P' is returned to its normal position.

The lever 23 at the substation A is polarized in order that if the contacts 14 and 15 become accidentally separated, the operating magnet 31 may not be actuated by an initial flow of current therethrough before the contacts 14 and 15 are closed by the energization of the core 13. The polarization of the lever 23 is in such a direction that it will only respond to a current flow through the operating magnet 31 in the same direction that current flow through the primary winding of the induction coil 12 will cause an operation of the armature 11 to separate the contacts 14 and 15. This provides that actuation of the operating magnet 31 can only take place when current has been properly applied to the line circuit to reverse the direction of energization of the core 13 whether the contacts 14 and 15 are closed or not.

It is to be noted that the operator's circuit, shown in connection with the system above described, is so arranged that no battery potential from the operator's set is impressed upon the listening key 43 and therefore false operation of the registering mechanism as a result of the application of potential from the operator's battery upon the cord circuit is impossible.

The arrangement of the meter operating mechanism at the substation D is identical with that shown and described for the substation A, the only difference being that in connection with the substation D the lever 23 is shown in its lower position and the switch hook 19 is shown in its normal position supporting the receiver R.

While I have shown my invention in the particular embodiment herein described, I do not, however, limit myself to this construction, but desire to claim any equivalent that may suggest itself to those skilled in the art.

What I claim is:

1. In a telephone exchange system, the combination with a main exchange, telephone lines extending from substations to such exchange, a meter at one of such substations, comprising an operating electromagnet having an armature which is moved away from its magnet by the mechanical operation of the switch hook when the latter is released to close the line, a source of current at the exchange for supplying current for talking purposes to the line, application of such current to a calling line inoperatively traversing the meter magnet, controlling mechanism for the meter included in the line circuit and inoperative to such current and means for reversing the direction of current flow to energize the meter magnet and actuate the meter by the attraction of its armature.

2. In a telephone exchange, the combination of a main exchange, telephone lines extending from substations to such exchange, a meter at one of such substations, a battery at the exchange adapted to send signaling current through a line when in calling condition, such current also traversing the meter controlling mechanism without effecting its operation, means for supplying talking current to the calling line through the meter controlling mechanism without operating the same, and a second source of current adapted to reverse the direction of current flow and means actuated when the called subscriber responds to connect such second source of current into the line to reverse the direction of current flow in the line and to simultaneously charge such battery to operate the meter.

3. In a telephone exchange system, the combination of a main exchange, telephone lines extending from substations to such exchange, a meter at one of such substations, two sources of current connected in opposition, means for connecting one of such sources to a line in response to a call, and means for connecting the second source through the first source to reverse the direction of current flow in the line to operate the meter.

4. In a telephone exchange system, the combination of a main exchange, telephone lines extending from substations to such exchange, a meter at one of such substations, two sources of current connected in opposition, means for connecting one of such sources to a line in response to a call to supply signaling and talking current to the line without operating the meter controlling mechanism, and means operated by the response of the called subscriber for connecting the second source through the first source to reverse the direction of current flow in the line to operate the meter.

5. In a telephone exchange system, the combination of a main exchange, telephone lines extending from substations to such exchange, a meter at one of such substations, a source of current at the exchange for supplying signaling current to the lines, an operating electromagnet for the meter, a controlling magnet having its coil connected to the line circuit, a circuit for the operating magnet having contacts, an armature for the controlling magnet coöperating with said contacts and adapted by its operation to cause the energization of the operating magnet, application of signaling current to a calling line traversing the controlling magnet in an inoperative direction, and means for reversing the direction of current flow through the line and the controlling magnet to cause its operation, such operation of the controlling magnet serving to cause current from the line to energize the operating magnet of the meter.

6. In a telephone exchange system, the combination of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, means for supplying signaling current to such line in response to a call in an inoperative direction relatively to such relay, and means for reversing the direction of current flow in the line to operate such relay, the operation of such relay serving to open the shunt circuit and cause actuation of the operating magnet.

7. In a telephone exchange system, the combination of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, means for supplying signaling current to such line in response to a call in an inoperative direction relatively to such relay, a second source of current of higher potential than the first source, and means for connecting such second source to the line circuit through and in opposition to the first source to operate such relay, the operation of such relay serving to open the shunt circuit and close actuation of the operating magnet.

8. In a telephone exchange system, the combination of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, means for supplying signaling current to such line in response to a call in an inoperative direction relatively to such relay, a second source of current of higher potential than the first source, and means automatically operated by the response of the called subscriber for connecting such second source to the line circuit through and in opposition to such first source to operate such relay, the operation of such relay serving to open the shunt circuit and cause the actuation of the operating magnet.

9. In a telephone exchange system, the combination of a main exchange, telephone lines extending from substations to such exchange, a meter at one of such substations, a source of current at the exchange for supplying current to such line in an inoperative direction relatively to the meter, a second source of current of higher potential than the first source, and means for connecting such second source to the line through and in opposition to such first source to cause actuation of the meter.

10. In a telephone exchange system, the combnation of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, mechanism associated with the switch hook at the substation to set the meter actuating mechanism when the switch hook is moved from its normal to its calling position, such switch hook serving when in its normal position to interrupt the circuit through such relay, means for supplying signaling current to such line in response to a call in an inoperative direction relatively to such relay, and means for reversing the direction of current flow in the line to operate such relay, the operation of such relay serving to open the shunt circuit and cause actuation of the operating magnet.

11. In a telephone exchange system, the combination of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, mechanism associated with the switch hook at the substation to set the meter actuating mechanism when the switch hook is moved from its normal to its calling position, such switch hook serving when in its normal position to interrupt the circuit through such relay, means for supplying signaling current to such line in response to a call in an inoperative direction relatively to such relay, a second source of current of higher potential than the first source, and means for connecting such second source to the line circuit through and in opposition to the first source to operate such relay, the operation of such relay serving to open the shunt circuit and cause actuation of the operating magnet.

12. In a telephone exchange system, the combination of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, means for supplying signaling current to such line in response to a call in an inoperative direction relatively to such relay, means for reversing the direction of current flow in the line to operate such relay, the operation of such relay serving to open the shunt circuit and cause actuation of the operating magnet, and a second shunt circuit about the terminals of the operating magnet adapted to be closed by the actuation of the meter.

13. In a telephone exchange system, the combination of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, mechanism associated with the switch hook at the substantion to set the meter actuating mechanism when the switch hook is moved from its normal to its calling position, such switch hook serving when in its normal position to interrupt the circuit through such relay, means for supplying signaling current to such line in response to a call in an inoperative direction relatively to such relay, a second source of current of higher potential than the first source, means for connecting such second source to the line circuit through and in opposition to the first source to operate such relay, the operation of such relay serving to open the shunt circuit and cause actuation of the operating magnet, and a second shunt circuit about the terminals of the operating magnet adapted to be closed by the actuation of the meter.

14. In a telephone exchange system, the combination of a main exchange, telephone lines extending from substations to such exchange, a meter at one of such substations, a source of current at the exchange for supplying signaling current to the lines, an operating magnet for the meter adapted to be operated by current flowing over the line circuit, a polarized relay connected with the line circuit and adapted to be actuated by current flow through the line in but one direction, a shunt circuit normally closed around the terminals of the operating magnet by such relay, mechanism associated with the switch hook at the substation to set the meter actuating mechanism when the switch hook is removed from its normal to its calling position, such switch hook serving when in its normal position to interrupt the circuit through such relay, means for supplying signaling current to such line in response to a call in an inoperative direction relatively to such relay, a second source of current of higher potential than the first source, a second relay at the exchange operated by response of the called subscriber, the operation of such second relay serving to connect such second source to the line circuit through and in opposition to the first source to operate the polarized relay, the operation of such polarized relay serving to open the shunt circuit and cause actuation of the operating magnet, and a second shunt circuit about the terminals of the operating magnet adapted to be closed by the actuation of the meter.

15. In a central energy telephone system, a substation meter comprising the combination of registering mechanism having a movable actuating member, a normally open line circuit extending from the substation to an exchange, means for automatically setting the actuating member mechanically in closing the line circuit to call the exchange, and means operated by the response of the called subscriber for actuating the member.

16. In a telephone system, a substation meter comprising the combination of registering mechanism, and an actuating member therefore, a line circuit extending from the substation to an exchange, means for automatically setting the actuating member mechanically in calling the exchange, and means operated by a reversal of current in the line circuit resulting from the response of the called subscriber for moving the actuating member.

17. In a central energy telephone system, a substation meter comprising the combination of registering mechanism, a normally open line circuit having extending from the substation to an exchange, means for mechanically setting the meter upon the closing of the circuit for talking purposes, and means electrically operated by response of the called subscriber for actuating the meter.

18. In a telephone system, a substation meter comprising the combination of registering mechanism, a line circuit extending from the substation to an exchange, an operating magnet for the meter, and a controlling magnet, such controlling magnet adapted to be operated by a reversal of current therethrough resulting from the response of the called subscriber.

19. In a telephone system, a substation meter comprising the combination of registering mechanism, an operating magnet for the meter, and a controlling magnet, a shunt circuit for the operating magnet such operating magnet normally rendered inoperative by the closing of the shunt circuit by the controlling magnet and placed in condition to operate by the opening of the shunt circuit by the controlling magnet.

20. In a telephone system, a substation meter comprising the combination of registering mechanism, an operating magnet for the meter, and a controlling magnet, such operating magnet normally inoperative and adapted to be placed in operative condition by motion of the substation switch hook to its calling position, such motion of the switch hook to a calling position serving to mechanically set the meter.

21. In a telephone system, a substation meter comprising the combination of registering mechanism, an operating magnet for the meter, and a controlling magnet, such operating magnet normally rendered inoperative by the controlling magnet and the substation switch hook and placed in condition to operate by motion of the switch hook to a calling position and by operation of the controlling magnet, such motion of the switch hook to a calling position serving to mechanically set the meter.

22. In a telephone exchange system, the combination with a main exchange having an instrument circuit leading to a substation, and an inductive type telephone set in said circuit comprising primary and secondary windings, a polarized pole piece arranged in said windings and an armature actuated thereby, of a service recording meter comprising a polarized electromagnet having its coil arranged in the instrument circuit, a branch circuit for shunting said meter magnets having contacts controlled by said armature, two sources for supplying current to the instrument circuit in opposite directions and means for alternately connecting said sources to said circuit.

23. In a telephone exchange system, the combination with a main exchange having an instrument circuit leading to a substation, and an inductive type telephone set in said circuit comprising primary and secondary windings, a pole piece magnetized by said windings and an armature therefor, said pole piece being polarized to attract its armature when influenced by current flowing in one direction, of a service recording meter having an operating electromagnet arranged in the instrument circuit and polarized to respond to current flowing in the other direction, a shunt circuit for said magnet having contacts controlled by said armature, a source of current and means for alternating its direction of flow over the instrument circuit.

24. The combination with a telephone circuit, metering mechanism comprising two polarized electromagnets arranged therein each controlling armatures and a branch circuit for shunting the coil of one of said magnets having two sets of contacts each set being adapted to be closed by one of said armatures, of a source of current and means for alternating its direction flow to actuate one or the other of said armatures.

25. The combination with a telephone circuit carrying the ordinary talking current and a pole changer for alternating the direction of flow of said current, of a metering apparatus comprising an electromagnet polarized to respond to current of one pole, a shunt circuit for short circuiting said magnet having contacts therein, a second polarized electromagnet responding to current of the other pole and adapted to close said shunt circuit.

26. The combination with a telephone circuit carrying the ordinary talking current and a pole changer for alternating the direction of flow of said current, of a metering apparatus comprising two electromagnets arranged in the line circuit each polarized to respond to current of one polarity only, a registering device actuated by one of the magnets and means controlled by the other magnet for closing the line circuit around the first mentioned magnet.

27. The combination with a telephone circuit carrying the ordinary talking current and a pole changer, of two electromagnets comprising coils arranged in the line circuit, each magnet being polarized to respond to current of one polarity only, a registering device adapted to be actuated by one of the magnets, a shunt circuit for the coil of said magnet controlled by the other magnet.

28. The combination with a telephone circuit carrying the ordinary talking current and a pole charger, of two electromagnets comprising coils arranged in the line circuit, each magnet being polarized to respond to current of one polarity only, a registering device adapted to be actuated by one of the magnets, a branch circuit leading from the telephone circuit forming a shunt for the coil of said magnet and having contacts therein controlled by the other magnet.

29. The combination with a telephone circuit comprising a telephone instrument set embodying a receiver hook, and a source of current, of a registering mechanism, an electromagnet arranged in the telephone circuit, an armature therefor for operating the register and operating connections between the receiver hook and armature for setting the latter in actuated position, a branch circuit leading from the telephone circuit around the magnet and having normally open contacts adapted to be closed upon the attraction of the armature.

30. The combination with a telephone circuit, the telephone set therein embodying a movable member for opening and closing the circuit, of an electromagnet comprising a coil connected in the circuit and an armature operated thereby, connections between the movable member and armature for setting the latter in actuating position when the former is adjusted to close the telephone circuit, a register adapted to be operated upon the attraction of the armature, and a branch circuit leading around the coil having normally open contacts adapted to be closed by the armature.

31. In a telephone system embodying telephone subscribers' circuits and a central office equipment comprising answering and calling cords, a source of current connected to both cords and means for alternating the direction of flow of said current over the answering cord, two oppositely polarized electromagnets arranged in each subscriber's circuit, a branch circuit leading from the latter for shunting one of said magnets and having two sets of normally open contacts therein one controlled by the magnet to be shunted, the second controlled by the other magnet, and a message metering device adapted to be actuated by said shunted magnet previous to its being short circuited.

32. In a telephone system, embodying a plurality of subscribers' circuits, a central office answering and calling cord circuits each having the usual relays, a pair of normally open contacts in the answering cord circuit adapted to be closed by the energizing of one of the relays of the calling cord circuit when a called circuit is closed, a source of current connected to said cord circuits and means for alternating the direction of flow of said current over a calling line, of metering apparatuses comprising registers, polarized electromagnets for operating them arranged in the subscribers' circuits, branch circuits leading from the latter around said magnets and having contacts therein, other electromagnets polarized in opposition to the first mentioned magnets also arranged in the subscribers' circuits and adapted to control the contacts of their respective branch circuits.

33. In a telephone subscriber's circuit, the combination with a metering apparatus comprising two oppositely polarized electromagnets arranged in the telephone circuit and having armatures adapted to be attracted alternately upon the flow of current in opposite directions through said magnets and branches leading from the telephone circuit forming shunts around one of said magnets, and having normally open contacts adapted to be closed by the operation of the armature of either magnet, of a registering mechanism adapted to be actuated by one of the armatures, means for manually setting it in retracted position, a source of current and means for alternating its direction of flow.

In witness whereof, I hereunto subscribe my name this 18th day of January, A. D. 1910.

GARRISON BABCOCK.

Witnesses:
ALBERT C. BELL,
ALBERT G. MCCALEB.